April 3, 1934.  C. SIMON  1,953,660
SELF ADJUSTING BRAKE MECHANISM
Filed Oct. 21, 1931
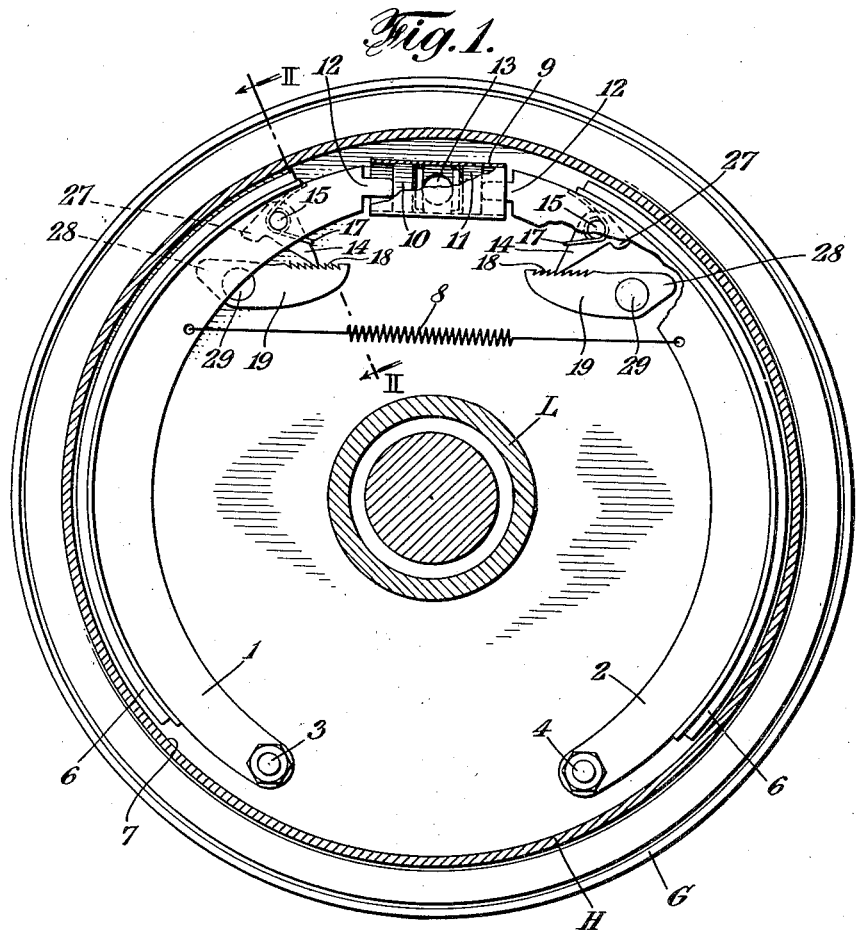
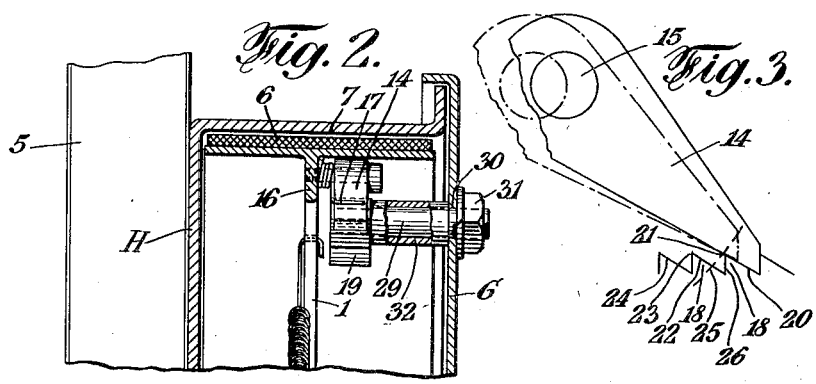
INVENTOR
Charles Simon.
BY
ATTORNEY Patented Apr. 3, 1934

1,953,660

UNITED STATES PATENT OFFICE 1,953,660

SELF-ADJUSTING BRAKE MECHANISM

Charles Simon, New York, N. Y.

Application October 21, 1931, Serial No. 570,055

2 Claims. (Cl. 188—79.5)

This invention relates to a self-adjusting brake mechanism, and an object of the invention is to provide simple, practical and efficient means whereby to compensate for the effect of wear of the brake shoe or shoes.

While this invention has particular value in connection with hydraulically operated brakes it will nevertheless be useful in other forms of brakes as well.

A more specific object is to provide means which will always hold the brake shoe or shoes against falling away from the brake drum an objectionable distance notwithstanding the inevitable wearing away of the brake shoes.

A further detailed object is to so construct the device that it may be readily mounted in operative association with brakes already standard in automobile structures.

Other objects and aims of the invention, more or less specific than those referred to above, will be in part obvious and in part pointed out in the course of the following description of the elements, combinations, arrangements of parts and applications of principles constituting the invention; and the scope of protection contemplated will be indicated in the appended claims.

In the accompanying drawing which is to be taken as a part of this specification, and in which I have shown merely a preferred form of embodiment of the invention:—

Fig. 1 is a side elevational view through an automobile brake mechanism showing the present invention in operative association therewith, the axle and the brake drum being shown in vertical section.

Fig. 2 is a transverse sectional view substantially upon the plane of line II—II of Fig. 1, and Fig. 3 is a diagrammatic view illustrating the operation of the dogs employed.

Referring to the drawing for describing in detail the structure which is illustrated therein, the reference character L indicates the vehicle axle housing upon which is fixed the plate G which carries the two brake shoes 1 and 2, said shoes being pivotally mounted upon said plate as at 3 and 4, and there being a brake drum as H fixed to a part of the vehicle wheel, as 5, and rotatable with the wheel and with respect to the plate G, all in the usual manner.

The brake shoes 1 and 2 have the usual friction facings as 6—6 thereon adapted, when the shoes are forced apart, to bear tightly against the inner surface 7 of the drum H, and a tension spring 8 extends between the two shoes 1 and 2 serving normally to hold said shoes drawn toward each other so that the facings 6 normally have no engagement with the surface 7 of the drum.

In the instance illustrated the brake shoes are intended to be operated by hydraulic means, and to this end the drawing illustrates a cylinder 9 open at its opposite ends and having two pistons as 10 and 11 slidable away from each other therein. The upper ends of the brake shoes have extensions 12 which project into opposite ends of the cylinder and engage the respective pistons 10 and 11. Oil or other liquid may be fed into the cylinder at a point intermediate the pistons through a suitable opening indicated at 13.

Whenever a quantity of oil is forced into the cylinder the pistons 10 and 11 are forced outwardly a distance determined by the amount of oil forced in. The brake shoes are forced apart a corresponding distance and this movement is intended to be sufficient to bring the brake facings 6 into tight frictional engagement with the surface 7 of the drum.

The mechanism by which oil may be forced into the cylinder 9 is not illustrated but is usually such as will force in a definite and limited amount of oil at one operation. If this amount is insufficient to drive the brake shoes with required tightness against the brake drum, due for instance to the fact that the brake facings may have become so badly worn that a relatively great movement of the shoe is required to bring the worn surface against the drum, then the brake action is deficient, and, as brake mechanisms of this type have heretofore been constructed, it has been necessary to make difficult and fairly costly adjustments to correct the error and insure a proper braking action of the mechanism at each operation.

According to the present invention it is proposed to pivotally mount upon each of the shoes 1 and 2, at a locality near to the cylinder 9, a small spring pressed dog as 14. These dogs may be carried upon pivot pins 15 fixed to the web 16 of the brake shoe, and the spring, as 17, may engage about the pin and have one end for engaging the flange part of the brake shoe and the other end pressing against the nose of the dog so as to always urge the nose of the dog downwardly and into engagement with the teeth as 18 of a small rack bar as 19 which is fixed rigidly to the plate G.

A single rack bar may be employed provided with two sets of teeth in its upper surface one for co-operation with each of the dogs 14 if desired, but preferably two separate rack bars are used one for each dog, said rack bars being spaced apart so as to leave an open space to accommodate other parts of the brake mechanism not herein illustrated.

The teeth 18 are of such size and shape and disposition that during the normal movement of a brake shoe into and out of braking engagement with the brake drum the nose of dog 14 will simply slide back and forth along the diagonally inclining surface as 20 of a single tooth, as graphically illustrated by the full lines and dotted lines in Fig. 3. When a brake facing is new the distance of movement of the shoe when forced into braking position, and the consequent distance of movement of the dog 14, will be not sufficient to enable the nose of the dog to reach the upper end edge as 21 of the tooth. As the brake facing wears away however the nose of the dog will move closer and closer to the edge 21 each time the brakes are applied, until finally when a sufficient part of the brake facing has worn off, the nose of the dog when the brake is applied will move up to and drop over the edge 21 and fall onto the inclined surface as 22 of the next succeeding tooth. Thereafter the nose of the dog will slide back and forth along the inclined surface 22 of said next succeeding tooth as the brake is applied and released from time to time.

When an additional sufficient part of the brake facing has worn away the nose of the dog will be able to drop over the upper edge as 23 of the surface 22 and drop onto, and thereafter rub along, the inclined surface 24 of the next succeeding tooth.

It is essential to the successful operation of this mechanism that the dogs 14 should not at any time be capable of holding the brake shoes in "on" position, and to this end the drawing herewith shows the shape of the teeth 18, and the relation of said teeth to the pivot pins 15 of the dogs, to be such that whenever the nose of the dog succeeds in dropping over the upper edge of one tooth and onto the next tooth the dogs will be able immediately to slide down along the inclined surface of said next tooth a suitable distance to enable unhindered movement of the brake shoes out of "on" position.

By reference to the illustration Fig. 3 it will be seen that the center of the pivot pin 15 is so positioned with respect to the teeth 18 that when the nose of the dog falls off of the upper edge as 21 of the surface 20 the end edge of said nose will describe an arc, as indicated by the dash line 25 and engage the surface 22 of the next succeeding tooth at a point substantially midway in the length of said surface 22. As soon as the brake is released therefore the nose of the dog will be free to slide downwardly along the lower half of said surface 22 until it comes to rest against the relatively vertical end wall as 26 of the preceding tooth, this being calculated to be a sufficient distance to permit of ample "off" movement of the brake shoes at all times.

The dogs 14 are preferably each formed with an extension part as 27 disposed for engaging against the flange portion of the adjacent brake shoe to hold the dog against objectionable turning movement about the pivot pin 15 under the strain of the spring 17, and thus to hold the dog in an approximately correct operative position particularly during the period of assembly of the mechanism.

The rack bars 19 may also be provided with extensions as 28 adapted to stand adjacent to the flange portion of the brake shoes for preventing excessive movement of said brake shoes toward "off" position at all times.

As a convenient means by which to readily mount the rack bars 19 upon the plate G the drawing herewith suggests that they may be fixed to said plate each by means of a bolt as 29 which is fixed to the respective rack bar by one end, the outer end portions of said bolts extending through openings as 30 provided in the plate G, lock nuts or other fastening means as 31 being applied onto the protecting outer ends of the bolts. Spacing sleeves as 32 may be placed around the bolts 29 for spacing the rack bars outwardly from the plate G at an appropriate distance, and the nuts 31 serve to clamp these spacing sleeves between the rack bars and the plate and thus hold all of said parts in rigid assembly with the plate.

It is noteworthy that the openings 30 through which the bolts 29 extend are usually to be found already provided in the plate G as said plate is provided in ordinary standard present-day automobile construction.

It will be seen that this mechanism is of a simple, substantial and durable character not likely to get out of order or to require manual attention or adjustment at any time. In operation it will automatically function to advance the normal "off" position of the brake shoes in consequence of and in proportion to wear of the brake shoes, so that a single injection of a given quantity of oil into the cylinder 9 will always be sufficient to move the brake shoes from a full "off" to a full "on" position.

As many changes could be made in this construction without departing from the scope of the invention as defined in the following claims, it is intended that all matter contained in the above description, or shown in the accompanying drawing, shall be interpreted as illustrative only and not in a limiting sense.

Having thus described my invention, what I claim as new and desire to secure by Letters Patent is:—

1. A self adjusting brake mechanism comprising a pair of brake shoes having facings thereon movable therewith into on and off positions with respect to the brake drum in the usual manner, an automatically operating mechanism effective in consequence of wear of said facings to advance the normal off position of said brake shoes during operation of said brake shoes, said automatically operating mechanism including one part relatively stationary and another part movable with the brake shoe, and said two parts having portions co-operative to permit unhindered movement of said parts with respect to each other in one direction but to provide a restricted return movement of said parts with respect to each other, said stationary part having a portion constituting a stop spaced slightly behind the brake shoe effective to prevent excessive movement of said brake shoe away from the brake drum.

2. A self adjusting brake mechanism comprising a pair of brake shoes having facings thereon movable therewith into on and off positions with respect to the brake drum in the usual manner, an automatically operating mechanism effective in consequence of wear of said facings to advance the normal off position of said brake shoes during operation of said brake shoes, said automatically operating mechanism including a relatively stationary toothed member and a dog pivotally mounted upon and movable with the brake shoe arranged to engage the teeth of the toothed member to thereby limit movement of the brake shoe with respect to said toothed member in one direction, and said dog having a part movable therewith to engage a portion of the brake shoe to limit pivotal movement of said dog with respect to the brake shoe effective thereby to determine the approximate operative position of the dog.

CHARLES SIMON.